US012693213B2

(12) United States Patent
Rella et al.

(10) Patent No.: US 12,693,213 B2
(45) Date of Patent: Jul. 28, 2026

(54) PER-FREQUENCY CORRECTION OF SPECTROSCOPIC INTERFERENCE

(71) Applicant: Picarro, Inc., Santa Clara, CA (US)

(72) Inventors: Chris W. Rella, Sunnyvale, CA (US); Andrea Biasioli, Irvine, CA (US); Craig M. Haupt, Sunnyvale, CA (US); Kai M. Skog, San Jose, CA (US); John A. Hoffnagle, San Jose, CA (US)

(73) Assignee: Picarro, Inc., Santa Clara, CA (US)

( * ) Notice: Subject to any disclaimer, the term of this patent is extended or adjusted under 35 U.S.C. 154(b) by 132 days.

(21) Appl. No.: 18/385,806

(22) Filed: Oct. 31, 2023

(65) Prior Publication Data

US 2025/0137921 A1 May 1, 2025

(51) Int. Cl.
*G01N 21/27* (2006.01)
*G01J 3/42* (2006.01)
*G01N 21/3504* (2014.01)

(52) U.S. Cl.
CPC .............. *G01N 21/274* (2013.01); *G01J 3/42* (2013.01); *G01N 21/3504* (2013.01)

(58) Field of Classification Search
CPC .. G01N 21/274; G01N 21/3504; G01N 21/39; G01N 2021/391; G01J 3/42; G01J 2003/2833; G01J 2003/284
See application file for complete search history.

(56) References Cited

U.S. PATENT DOCUMENTS

| | | | |
|---|---|---|---|
| 2012/0242997 A1* | 9/2012 | He | G01J 3/28 |
| | | | 356/402 |
| 2016/0011101 A1 | 1/2016 | Ognibene | |
| 2019/0226947 A1* | 7/2019 | Young | G01N 15/1404 |
| 2020/0049556 A1* | 2/2020 | Rella | G01N 21/39 |

OTHER PUBLICATIONS

Chen et al., "Accurate measurements of carbon monoxide in humid air using the cavity ring-down spectroscopy (CRDS) technique", 2013, Atmos. Meas. Tech., 6, 1031-1040.
Rella et al., "Local- and regional-scale measurements of CH4, 13CH4, and C2H6 in the Uintah Basin using a mobile stable isotope analyzer", 2015, Atmos. Meas. Tech., 8, 4539-4559.
Hou et al., "A Method for Correcting the Interference of Overlapping Absorption Lines Using Second Harmonic Spectral Reconstruction", 2022, Appl. Sci. v12 n73. https://doi.org/10.3390/app12010073.

* cited by examiner

*Primary Examiner* — Tarifur R Chowdhury
*Assistant Examiner* — Akbar H. Rizvi
(74) *Attorney, Agent, or Firm* — LUMEN PATENT FIRM

(57) ABSTRACT

Improved correction of optical absorption spectroscopy results for trace gas detection is provided by correcting for species crosstalk (and other environmental effects) on a per-frequency basis. Analyte concentrations are then determined by curve fitting to the corrected absorption spectrum. This is in marked contrast to the conventional approach of first performing a curve fit to determine analyte concentrations, then correcting the analyte concentrations to account for species crosstalk and other environmental effects. In some embodiments, the number of parameters for the per-frequency corrections are automatically determined from the data (e.g., using a LASSO regression).

11 Claims, 10 Drawing Sheets

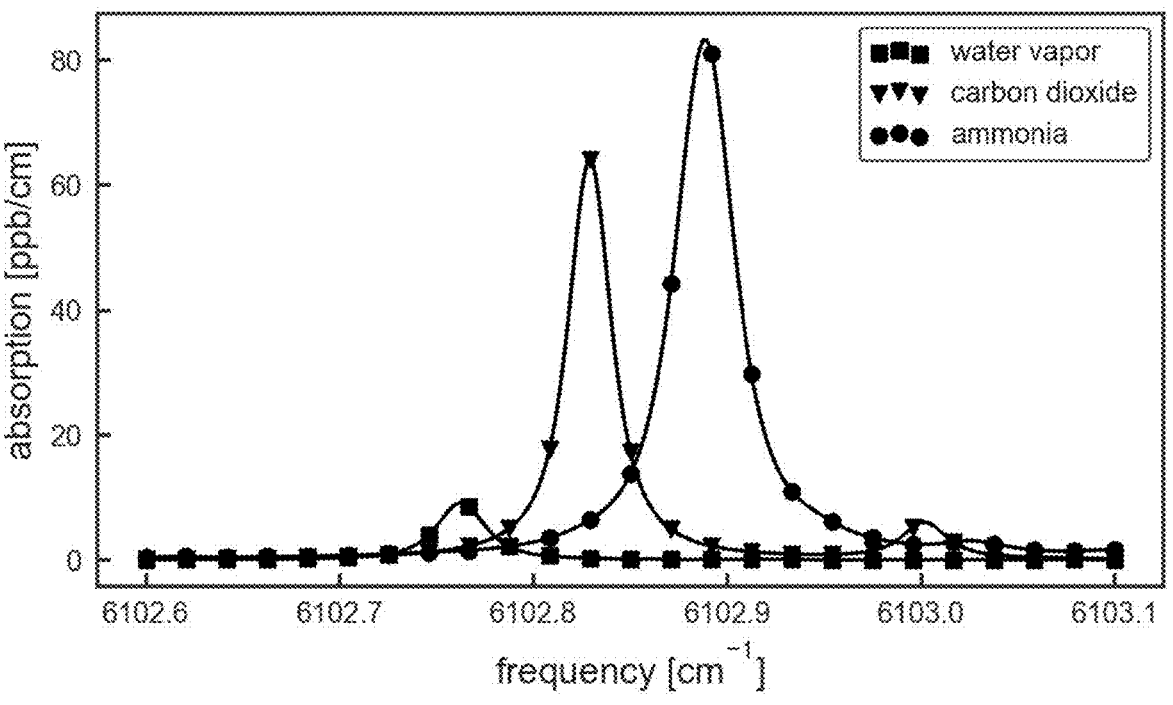
FIG. 1A
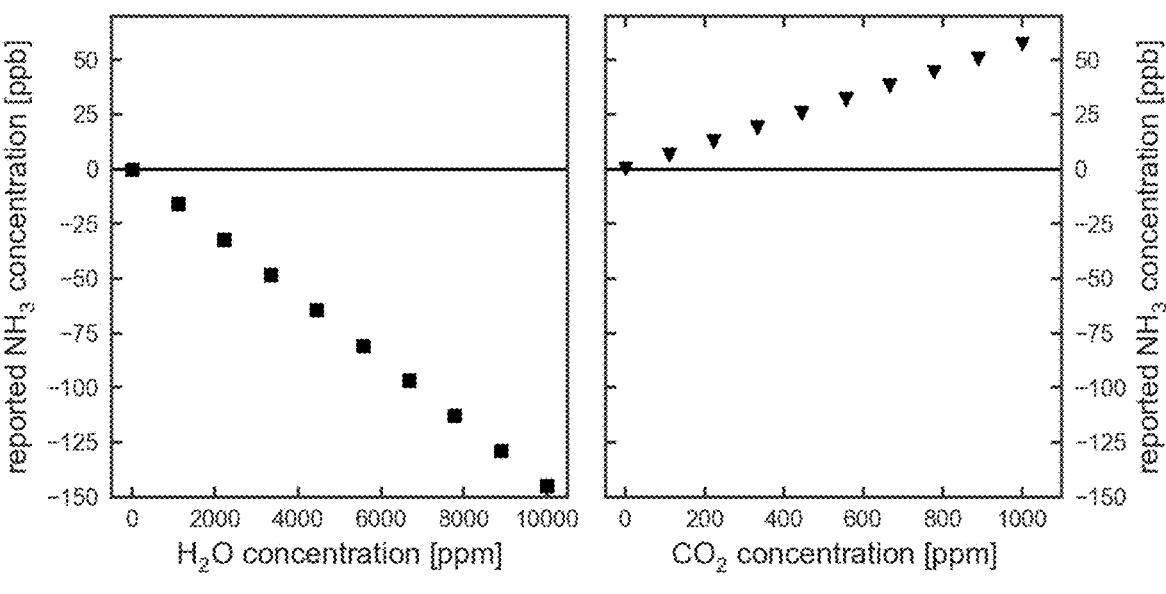
FIG. 1B                    FIG. 1C absorption

202 raw model parameters $p_1$, $p_2$, $p_3$, ...

frequency first fit a model to the raw absorption spectrum to provide raw model parameters (such as analyte concentrations)

then correct the raw model parameters $p_1$, $p_2$, $p_3$, ... to provide corrected model parameters $p'_1$, $p'_2$, $p'_3$, ...

first correct the raw absorption a(f$_i$) (filled circles) at each frequency f$_i$ to provide corrected absorption spectrum (open circles)

then fit a model to the corrected absorption spectrum to provide corrected model parameters (such as analyte concentrations)

PER-FREQUENCY CORRECTION OF SPECTROSCOPIC INTERFERENCE

FIELD OF THE INVENTION

This invention relates to gas phase chemical analysis using absorption spectroscopy.

BACKGROUND

There are a variety of measurement approaches in which the measured absorption spectrum of a gas sample is used to quantify the concentration of one or more gas phase compounds. Examples of these measurement approaches include Fourier Transform Infrared Spectroscopy (FTIR) as well as a host of laser-based techniques such as Tunable Diode Laser Absorption Spectroscopy (TDLAS), Integrated Cavity Output Spectroscopy (ICOS), and Cavity Ring Down Spectroscopy (CRDS), among many others. These techniques generally all rely on the same basic analysis process:

1) The spectrometer is used to measure the experimental absorption spectrum of a gas sample.
2) This sample spectrum is then analyzed against some spectral library of compounds, where each entry is a spectrum either of the pure sample or of the sample diluted in an optically-inert balance gas, and where the concentration of the gas corresponding to the spectrum in the library is known. We call each spectrum in the library a "model function".
3) Commonly, a least-squares approach is taken to minimize the data-model mismatch, where the model is a sum of the model functions for each individual compound multiplied by the concentration of the compound. This analysis takes advantage of the Beer-Lambert law, which states that the total absorption is simply the sum of the individual absorption signatures. The concentrations of the individual compounds are simply the concentrations that minimize the data-model mismatch.

When only one absorbing compound is present, this process is rather simple. When two or more compounds are present, the reported concentrations can have systematic errors that is often referred to as "crosstalk" between the two species. We define crosstalk as an error in the measurement of a given analyte gas due to the presence of one or more other compounds. In general, crosstalk will occur whenever the actual absorption spectrum of a given compound does not match what is in the model. In these instances, it is important to note that there can be reported errors not only in the compound for which the model function is erroneous, but also for the other compounds present in the fit. The least squares optimization will attempt to distribute the error in the one model function among the reported concentrations of the other compound, in such a way that the overall data-model mismatch is minimized. For example, for a gas sample containing two gases, $CO_2$ and $NH_3$, an error in the $CO_2$ model function will lead to a reporting error in both compounds. The error in the reporting of $CO_2$ is a nonlinearity or inaccuracy that we will not address here; however, the error in the reporting of $NH_3$ falls under the category of crosstalk ("crosstalk of $CO_2$ onto $NH_3$") and is the topic of this application.

There can be a variety of sources of this model function error, including:

a) The line shape model used to generate the model function is inaccurate.

b) There is noise or bias in the data used to create the model function.
c) The temperature or pressure at which the model function was collected does not match the temperature or pressure of the gas sample. More generally, the temperature or pressure dependence of the model can be inaccurate.
e) The carrier gas used to collect the model function is different than the carrier gas of the gas sample. Even non-absorbing carrier gases can affect the absorption spectra of absorbing species via differences in the line shape and line centers of the absorbing compounds. These differences can lead to model function errors if not properly accounted for. More generally, the carrier gas dependence of the model can be inaccurate.
f) The stable isotope abundances of the model function is different than the stable isotope abundances of the compound in the gas sample. For example, carbon has two stable isotopes, $^{12}C$ (the most abundant) and $^{13}C$ (which is typically about 1% of the total carbon). Because of the difference in the mass of the carbon atoms, these two species have fundamentally different spectra. Therefore, variation of the stable isotope abundances can lead to model function errors. More generally, the stable isotope dependence of the model can be inaccurate.
g) An impurity was present when the library model function was collected.
h) There is a concentration-dependence of the spectrum of the molecule, such that the concentration(s) at which the model function was collected has a different spectrum than the spectrum of that same compound in the gas sample. More generally, the concentration dependence of the model can be inaccurate.

Generally, the ideal solution is to try to correct the model in such a way that correctly incorporates the variable in question, whether it be another compound, temperature, pressure, etc. In practice, however, this is not always easy to accomplish, as it may require extensive experimentation to determine the correct spectral parameters, or computing the correct spectrum might be computationally intensive.

A practical approach that is commonly employed is to perform experiments in which the parameters of concern are varied, and the effect of the variation is observed in the reported output concentrations. We return to the concrete example of the instrument that measures $NH_3$ and $CO_2$, where there is an error in the $CO_2$ model function. An experiment is performed in which the $NH_3$ concentration in the gas sample is held fixed, and the $CO_2$ is varied. Due to the error in the $CO_2$ model function, the $NH_3$ is misreported. A simple approach is to create a correction term for $NH_3$ that is a Taylor series in $CO_2$ concentration, which will correct the observed crosstalk of $CO_2$ onto $NH_3$.

FIGS. 1A-C show an example of this kind of correction. Here FIG. 1A shows exemplary model functions for $CO_2$, $H_2O$ and $NH_3$. FIG. 1B shows the effect of $H_2O$ concentration on reported $NH_3$ concentration, and FIG. 1C shows the effect of $CO_2$ concentration on reported $NH_3$ concentration. As indicated in this example, such corrections can be applied for each interfering species (here $CO_2$ and $H_2O$).

This conventional approach has several advantages:

1) The correction is computationally simple, requiring only simple algebra to compute the corrected values.
2) No knowledge of the spectroscopic error itself is required, simplifying the analysis and implementation.
3) Corrections are applied to the output directly, using observables (like concentration, or temperature) as inputs, and thus can be applied as a posterior correction after the spectral fit has been performed.

4) The experiment is straightforward to design and implement.

This approach can be extended in a straightforward manner to crosstalk from more than one species, or to nonlinear responses as a function of concentration, or even crosstalk where the errors are proportional to the product of the concentrations of two gases, simply by adding more terms to the crosstalk correction. For example, the correction to $NH_3$ due to errors in the $CO_2$ and $H_2O$ model functions could be expressed in the following way:

$$\Delta_{NH_3} = \sum_{i=CO_2,H_2O} a_i c_i + \sum_{i=CO_2,H_2O} \sum_{j=CO_2,H_2O} b_{ij} c_i c_j$$

This is a second-order correction which could have linear and quadratic terms in the concentrations of $CO_2$ and $H_2O$ as well as a bi-linear term that is proportional to the product of the two gas concentrations. The coefficients $a_i$ and $b_i$ are determined from an experiment in which concentrations of the two gases $CO_2$ and $H_2O$ are varied as the $NH_3$ concentration is held fixed.

This is a generally effective approach, and it is by far the most common method for correcting crosstalk in spectroscopic instruments. It is however not without drawbacks that limit its utility in certain situations:

1) The coefficients determined from the experiment are inextricably linked to the specific spectral points that are collected during the measurement. It is not hard to see that if you change the range of spectral points covered during the spectral scan, the least squares optimization algorithm will produce different errors in the target analyte (e.g., $NH_3$) due to the specific spectral errors in the $CO_2$ model function.

2) Similarly, the correction coefficients determined from the experiment are also inextricably linked to the free parameters present in the least-squares optimization. If, for example, the concentration of another gas (e.g., $H_2O$) is added to the fit, the effect of the model function error in $CO_2$ will appear in different ways on the reported $NH_3$ value.

What this means in a practical sense is that, once the correction coefficients are determined, the spectral scan and the components of the fit cannot be changed. This restriction is typically not important for most applications in which laser-based spectrometers are employed—spectral scan and free parameters in the fit are normally defined during the manufacturing process and are not changed after shipment.

SUMMARY

However, there are applications in which it would be advantageous to change either the data points collected during the spectral scan or to change the list of free parameters present in the fit. Often, one may want to change these in tandem-adding another compound to the optimization might be accompanied by changes to the spectral scanning to optimize the measurement of this other compound. Using the paradigm above, the instrument would have to be tested separately in two modes of operation: one with the original scan and set of free parameters, and one with the new scan and new set of free parameters. For each mode, there would need to be a unique set of crosstalk correction coefficients derived from the analysis of a carefully controlled experiment that is typically performed only when the spectrometer is built in a specially designed test station. If one would like to add another free parameter to the optimization, the instrument would need to be sent back to the laboratory to perform the requisite crosstalk experiment and derive the appropriate crosstalk correction coefficients.

To avoid this complication, we have created a novel approach to crosstalk correction. Rather than correct the crosstalk effect on the outputs of the least squares optimization, we instead correct the input spectra directly prior to fitting. We perform the same crosstalk experiment as described above, but with the spectrometer operating in a special mode in which it is collecting data at all candidate spectral points. All future spectral scans will be constructed out of a subset of these spectral points. We then determine correction factors on a per-frequency basis, in which the parameter that we are correcting is the measured spectrometer absorption at each frequency in the set of candidate spectral points. These correction factors take the following form:

$$\Delta_{a(v_k)} = \sum_{i=CO_2,H_2O} f_{ik} c_i + \sum_{i=CO_2,H_2O} \sum_{j=CO_2,H_2O} g_{ijk} c_i c_j$$

In other words, we have a system of crosstalk correction factors (one at each frequency $v_k$), where each set of correction factors is a Taylor expansion of the measured absorption measured at the frequency as a function of the crosstalk parameters (in the example, the concentrations of $CO_2$ and $H_2O$).

To implement these crosstalk parameters, for each frequency measured in the spectrum, the absorption is corrected on the basis of the Taylor expansion prior to the final fit of the data. It is important to note that every parameter in the Taylor expansions must be available as a determined variable prior to this final fit. This can be accomplished, for example, with a pre-fit in which those compounds concentrations are determined. Clearly, these early estimates of the concentrations might have crosstalk present in their results. This is acceptable, in the sense that the crosstalk corrections could absorb those errors into the overall crosstalk correction. All that matters is that we have repeatable observables that we can use in each Taylor expansion at each frequency.

The fact that we are correcting the absorption on a per frequency basis means that any spectrum that is a subset of the spectrum used to create the coefficients can be properly corrected. And the fact that we are correcting the absorption prior to fitting means that we can add or remove parameters from the optimization without adversely affecting the efficacy of the crosstalk correction. These changes to the spectral scan and/or the optimization can occur in the field, in real time, while maintaining the crosstalk correction.

This flexibility comes at a cost of additional software bookkeeping to manage a large set of crosstalk coefficients for each frequency (which can number in the hundreds or thousands), and some computational overhead of calculating coefficients on the fly for every measured spectrum.

One application of this approach is especially attractive, which is the measurement of trace levels volatile organic compounds (VOCs) in ambient air. VOCs number in the thousands, and typically have smoothly varying model functions that are not orthogonal from one another. Measuring all possible spectral points and fitting those spectral points with all the compounds simultaneously is sometimes possible, but generally delivers very poor precision and is very slow.

Rather, it is better to tailor the frequency points scanned and the suite of compounds to match the sample composition, so that an optimized performance can be achieved. Complicating the analysis are the common atmospheric constituents: the primary three optical absorbers ($CO_2$, $H_2O$, and $CH_4$) and the inert compounds (typically $N_2$, $O_2$, and Ar), which do not absorb directly but affect the spectra of the other common optical absorbers. Because these three common absorbers are ubiquitous and absorb so strongly in the near-infrared compared to the absorption of the trace VOCs, it is commonly necessary to perform crosstalk correction. By using the legacy approach of correcting concentrations, one would have to know the mixture of VOCs present in the sample a priori, which is unfortunately not always practical in real applications. However, by applying this novel per-frequency crosstalk correction, one can change the spectral scan and the fit parameters at will, leading to optimized measurement performance without suffering from crosstalk from the common atmospheric species.

In the above discussion, we focused on gas concentrations as the parameters to be used in the Taylor expansion. However, the approach is not restricted to gas concentrations; it can be generalized to any parameter that can be measured either with spectroscopy or with another sensor (e.g., a thermistor), or information supplied externally either about the gas sample, the spectrometer, or the environment in which the gas sample was drawn or the spectrometer is housed.

BRIEF DESCRIPTION OF THE DRAWINGS

FIGS. 1A-C show an example of crosstalk in reported ammonia concentration due to water vapor and carbon dioxide.

DETAILED DESCRIPTION

Section A describes general principles relating to embodiments of the invention, and section B considers some examples in greater detail.

A) GENERAL PRINCIPLES

As indicated above, an exemplary embodiment of the invention is a method including:
1) measuring optical absorption with an optical spectroscopy instrument at two or more distinct measurement frequencies to provide a raw spectrum; and
2) for each measurement frequency, correcting its corresponding optical absorption by subtracting a corresponding correction to provide a corrected spectrum.
Here each correction is a polynomial in one or more environment variables having per-frequency coefficients determined by a prior calibration. This polynomial can have terms of any total degree, although terms of total degree 3 or less are expected to be most relevant in practice.

Figure 2:
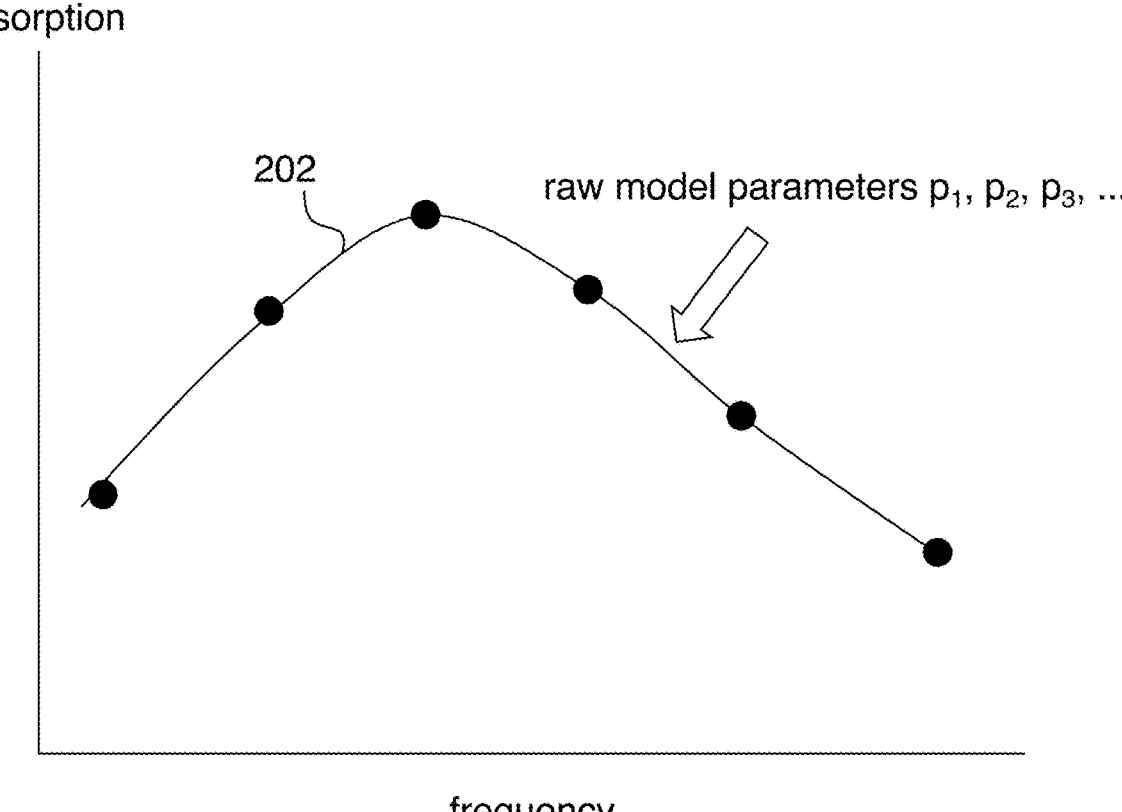
FIG. 2 schematically shows the conventional crosstalk correction approach of first performing the curve fit, then performing a crosstalk correction of the resulting fitting parameters to determine analyte concentrations etc.

The difference between this approach and the conventional approach described above is schematically shown on FIG. 3 (this work) and FIG. 2 (conventional). In the conventional approach of FIG. 2, the first step of the data analysis is to fit curve 202 to the measured absorption spectrum (data points are shown here as dark circles). This fit results in raw model parameters $p_1$, $p_2$, $p_3$, . . . which are corrected as described in the background section to account for crosstalk to provide corrected parameters $p'_1$, $p'_2$, $p'_3$, . . . .

Figure 3:
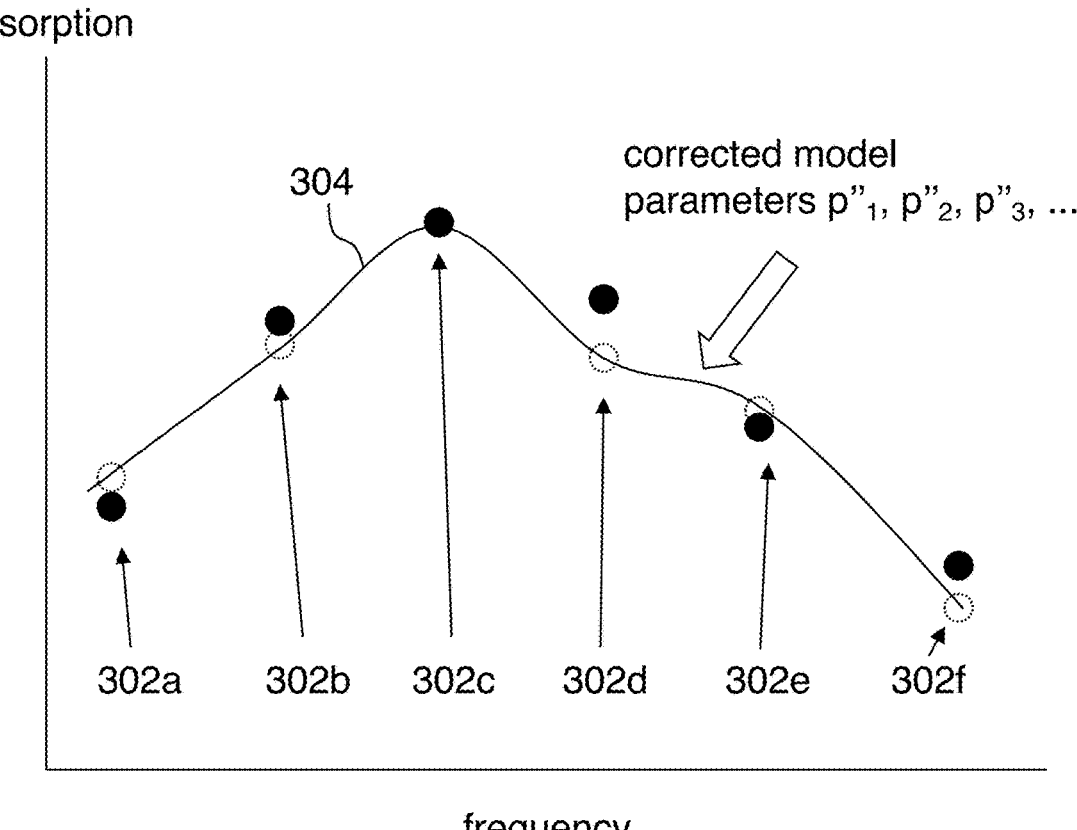
FIG. 3 schematically shows the present approach for crosstalk correction, where a separate crosstalk correction is applied to absorption at each measured frequency, then curve fitting to the resulting corrected spectrum is used to determine analyte concentrations etc.

In contrast, FIG. 3 schematically shows the present approach. Here the crosstalk corrections are applied on a per-frequency basis to each point in the measured spectrum. This is shown as the per-frequency differences 302a, 302b, 302c, 302d, 302e, 302f, . . . between the solid circles (raw spectrum) and the dotted circles (corrected spectrum). Since this correction is a signed quantity, the corrected absorption at any given frequency can be larger or smaller than the raw absorption at that frequency, as in the example of FIG. 3. It is also possible that the correction at a particular frequency is negligible (e.g., 302c on FIG. 3).

After the corrected spectrum is determined, a curve 304 is fitted through the data points of the corrected spectrum. Note that on FIG. 3, curve 304 goes though the dotted circles of the corrected spectrum, instead of going through the solid circles of the raw spectrum (except in cases of coincidence like 302c). This fit results in corrected model parameters $p''_1$, $p''_2$, $p''_3$, . . . which have been corrected to account for crosstalk in accordance with principles of the invention. Thus, a spectral fit to the corrected spectrum can be performed to determine one or more analyte concentrations. This results in reducing effect of spectral interference on accuracy of analyte concentration measurements due to use of the corrected spectrum.

The two or more distinct frequencies are preferably selected from a predetermined frequency list. In such cases the prior calibration preferably includes determining per-frequency coefficients for all frequencies in the predetermined frequency list. In such cases, it is further preferred to delete any data point of the raw spectrum having a frequency difference from a nearest frequency of the predetermined frequency list above a predetermined error threshold. The reason for this is that such data points are presumed to be in error (e.g., from an instrument error or the like), and so their deletion is likely to improve results.

The one or more environment variables can include, but are not limited to: pressure, temperature, concentrations of one or more absorbing gas species, concentrations of one or more non-absorbing gas species, relative isotope abundance of one or more absorbing gas species, $H_2O$ concentration, $CO_2$ concentration, and $CH_4$ concentration.

Values of the one or more environment variables can be obtained in various ways, such as: spectroscopic measurement, sensor measurement, and specified environment conditions.

The prior calibration can include determining the per-frequency coefficients according to a method selected from the group consisting of: calibration measurement and spectral modeling. In other words, any suitable combination of measurement and modeling can be used to determine the per-frequency coefficients.

Figure 4:
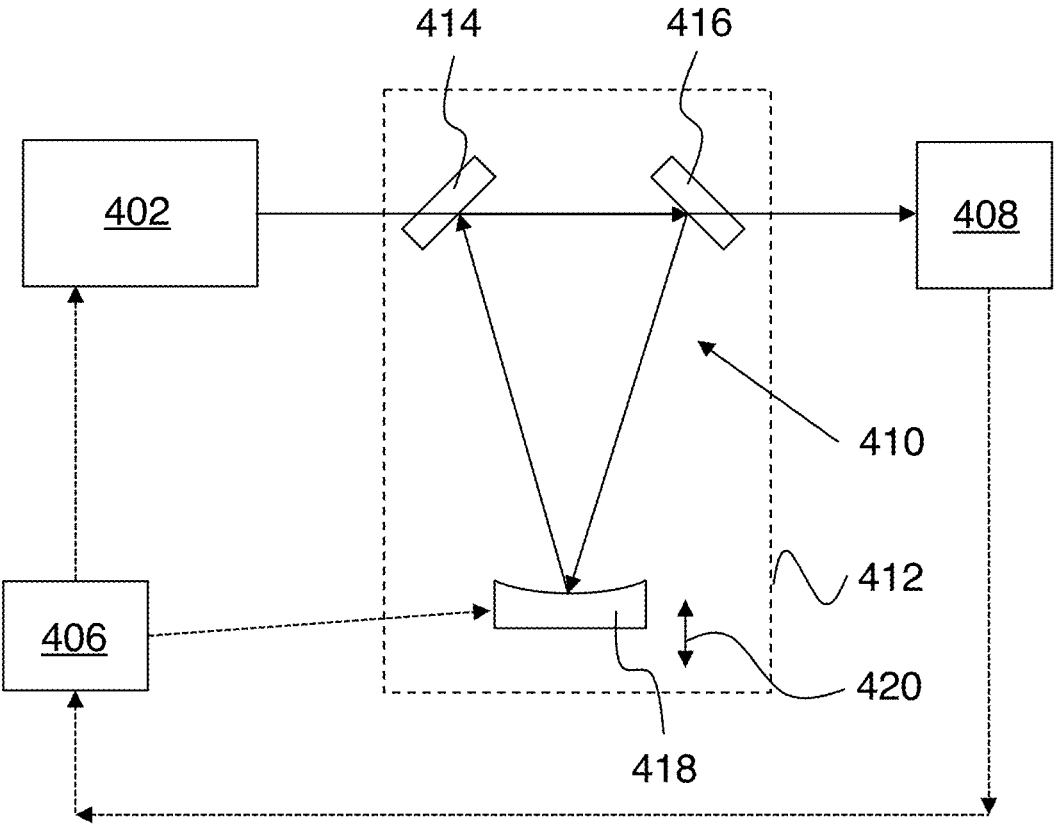
FIG. 4 schematically shows an exemplary optical spectroscopy instrument.

Suitable optical spectroscopy instrument include, but are not limited to: cavity ring-down spectroscopy (CRDS) instruments and cavity enhanced absorption spectroscopy instruments. FIG. 4 shows an exemplary CRDS instrument. This example includes an optical source 402, and an optical cavity 410 configured to accept an optical input from optical source 402 as shown. Optical cavity 410 has two or more mirrors (e.g., mirrors 414, 416, and 418 forming a ring resonator) and is also configured to accept a sample gas such that light circulating in the optical cavity passes through the sample gas. Here 412 schematically indicates that cavity 410 is part of a gas sample flow cell. Detector 408 receives ring-down signals from cavity 410. The example of FIG. 4 further includes a ring down controller 406 configured to monitor the light circulating in the optical cavity and configured to couple and interrupt coupling of light between the optical source and the optical cavity. Ringdown controller 406 can initiate ring-downs by altering the cavity length (schematically shown with arrows 420) or by making fine adjustment to the output wavelength of source 402.

The terms of the polynomial in one or more environment variables can be a selected subset chosen from a master list of correction terms, where this selection of the subset is a data-driven selection. Input for this data-driven selection can be from: spectral models and the raw spectrum. The data driven selection can include performing a Least Absolute Shrinkage and Selection Operator (LASSO) analysis to determine the selected subset on a per-frequency basis.

B) EXAMPLES

This example considers LASSO regression in the per-frequency crosstalk problem in more detail. The use of LASSO regression allows one to drop uninformative predictors from a regression problem automatically. This can reduce overfitting, improve coefficient interpretability, and reduce variance on coefficients estimates.

To start, it will be helpful to revisit the formulation of the per-frequency crosstalk problem. Suppose we measure room air in our analyzer: we always find $H_2O$, $CO_2$, $CH_4$ (the big three) at fairly large concentrations. We want to remove those contributions, so that our spectrum is only representative of the trace absorbers that we are interested in; the resulting spectrum is called the partial_fit (i.e., "partial_fit" here is the "corrected spectrum" above).

Since our models for the big three are not perfect, the removal does not always work well. Given the imperfections in the big three modeling, and their relatively high concentration, some interaction effects occur, meaning that each effect cannot be studied separately, which is the above-described crosstalk problem.

For example, if our models were perfect, we would have partial_fit=0 at all frequencies in this case (i.e., no analytes present, perfect removal of spectral interference). That's not what we see in practice. Not only is partial_fit nontrivial compared to typical trace species absorption, but the partial_fit spectra have very different characters at different big three concentrations.

We want to correct the partial_fit and bring it to zero. In this example, our corrections are functions of the concentrations of $H_2O$, $CO_2$, $CH_4$, HDO, $N_2$ (linear terms) and their interactions $H_2O^2$, $H_2O\ CO_2$, $H_2O\ HDO$, . . . (quadratic or bilinear terms). Higher order terms and/or additional species (both chemical and isotopic) can be included. E.g., here HDO is water with one hydrogen replaced with deuterium.

It is convenient to refer to these terms as predictors. These predictors are polynomial terms in the environment variables (here the environment variables are concentrations of $H_2O$, $CO_2$, $CH_4$, HDO, $N_2$, also referred to as base species in the following). More generally, as indicated above, environment variables aren't limited to concentrations and can include any relevant parameters.

Absorption at each frequency can be impacted differently by the value of these predictors, for spectroscopic reasons (such as the presence of absorption lines for some compounds and/or others): this means that each frequency can and should be analyzed separately (i.e., per-frequency).

For each frequency $\vartheta$ in the scheme of frequencies $\Omega$, we can use a linear regression model to correct for these crosstalk effects:

$$y_\vartheta = X\beta_\vartheta + \epsilon_\vartheta \text{ with } \vartheta \in \Omega$$

where:

$y_\vartheta$: the partial_fit values recorded at frequency $\vartheta$. Here, $y_\vartheta \in \leq_{\mathbb{R}}{}^N$, where N is the number of points in the spectrum.

X: the values of the predictors. They are "concentrations" (quotes because they are concentrations or products of concentrations), and as such they are independent from frequency. $X \in \mathbb{R}^P$ Dimensions: p is the number of predictors.

$\beta_\vartheta$: the per-frequency crosstalk correction coefficients. $\beta_\vartheta \in \mathbb{R}^{N \times p}$. Dimensions: N is the number of spectral points and p is the number of predictors. Thus we have a per-frequency correction because $\beta_\vartheta$ is, in general, different at each frequency.

$\epsilon_\vartheta$: the residual error. Dimensions: N the number of points in the spectrum.

The values of $\beta_\vartheta$ are the goal of the crosstalk correction. At each frequency $\vartheta$, we would like to have one coefficient for every predictor, so that when we multiply the predictor values ("concentrations") by their crosstalk correction coefficients, we get a spectral correction $\hat{y}_\vartheta$ that will bring the partial_fit $y_\vartheta$ to zero (or as close as we can).

Suppose we have $\beta_\vartheta$ available to us, we measure a spectrum/partial_fit y, its value at frequency $\vartheta$ is $y_\vartheta$, and we know our concentrations of $H_2O$, $CO_2$, $CH_4$, HDO, $N_2$ (environment variables). The correction process would look like this:

From the base species (concentrations of $H_2O$, $CO_2$, $CH_4$, HDO, $N_2$), build X (concentrations or products of concentrations).

Get the spectral correction $\hat{y}_\vartheta = X\beta_\vartheta$.

Corrected spectrum is $y_\vartheta - \hat{y}_\vartheta$.

If the process went well, the corrected spectrum should be as close to zero as possible.

This process is repeated for all frequencies $\vartheta$ in scheme frequencies $\Omega$.

A slope term can be added to remove time trends from the crosstalk coefficients. In such cases, a column can be added in X, $\Delta t = t_n - t_0$ n=(0, . . . , N), with the time delta from the first experiment time as the values in that column. This can be expressed in seconds, or hours, or any other time scale. In the crosstalk problem this is often not important, as predictors are typically scaled and centered (more on this later).

Various issues can affect how well the correction works:

Using predictors that are inadequate to describe the problem.

Having other interfering species that get incorporated into $\beta_\vartheta$.

Presence of time-transient effects that affect $\beta_\vartheta$. These can be interfering species that change or fade out during the course of an experiment, or time-dependent instrument effects (drift).

The crosstalk experiment entails changing the concentration of one of the base species while keeping the other ones fixed. The base species concentration should span the range of reasonable values expected to be encountered in real-life applications: this will ensure that our linear model will never be operated outside of the tested bounds (i.e., it is preferred to avoid extrapolating).

As indicated earlier, having inadequate predictors can lead to unsatisfactory performance. We often identify the proper predictors by thinking about which predictors are physically reasonable based on our understanding of spectroscopy.

However, as we keep adding base species and higher order predictors to our model, it becomes harder and harder to "guess" which parameters would be helpful for the correction. Adding more and more predictors can be risky:

It can cause overfitting (good performance on the training data, but poor generalization performance on new data)

The interpretability of coefficients (i.e., importance of each term in the correction) is not obvious anymore, as collinear feature might compete with each other.

To reduce the risk of overfitting, we might remove predictors that were important for prediction By selecting predictors a priori, we are introducing bias.

Adding more predictors increases the uncertainty on their coefficient estimation.

These considerations motivate applying LASSO regression in this context.

The linear least squares (LLS) approach can be expressed as $$\underset{\beta \in \mathbb{R}^p}{\text{minimize}} \left\{ \frac{1}{2N} \|y - X\beta\|_2^2 \right\}$$

where p identifies the number of predictors.

Possible issues include:

prediction accuracy (performance): LLS has low bias but high variance. By setting some coefficients to zero we introduce bias but we can reduce variance on predicted values.

more difficult interpretation, as all predictors typically have coefficients different from zero.

LASSO regression can be expressed as $$\underset{\beta \in \mathbb{R}^p}{\text{minimize}} \left\{ \frac{1}{2N} \|y - X\beta\|_2^2 + \lambda\|\beta\|_1 \right\}$$

LASSO adds a L1-constraint on the value of the coefficients. The geometry of this constraint has the effect of shrinking some of these coefficients to zero, leading to a sparse solution when $\lambda$ is sufficiently large.

We prefer a sparse solution because it will tend to set to zero the values of coefficients of predictors that don't have any predictive ability (they have little to no value in determining a suitable correction for our problem) and it makes our solution easier to interpret. Moreover, it can reduce the variance on the predicted values.

The minimization problem above has one hyper-parameter $\lambda$. The higher the value of $\lambda$, the higher the strength of the constraint that we are imposing, i.e., the more terms are going to be set to zero.

A preferred way to determine A is with cross-validation. Cross-validation is based on creating training and test datasets by splitting the original dataset K-fold (typically 5 to 10). We designate 1 fold as the test data, and the remaining K−1 folds as training data: we train N models (for N different $\lambda$ values) using the training data, and record the prediction error MSE (mean square error) or RMSE (root mean square error) evaluated on the test data (proxy for the generalization error on unseen data). We then repeat this K times (each of the K folds acts once as test data).

For each $\lambda$ we will have K error estimates, and we can plot a curve of the prediction error (and its standard error) as function of $\lambda$. We prefer to select the largest $\lambda$ (strongest penalty) that has a mean error within one standard error of the minimum error: this is commonly known as the "one standard error rule". This ensures that we are using the simplest model that gives an error that is within the error uncertainty of the best model.

FIGS. 5-8 show some examples of LASSO vs. LLS approaches in this context.

Figure 5A:
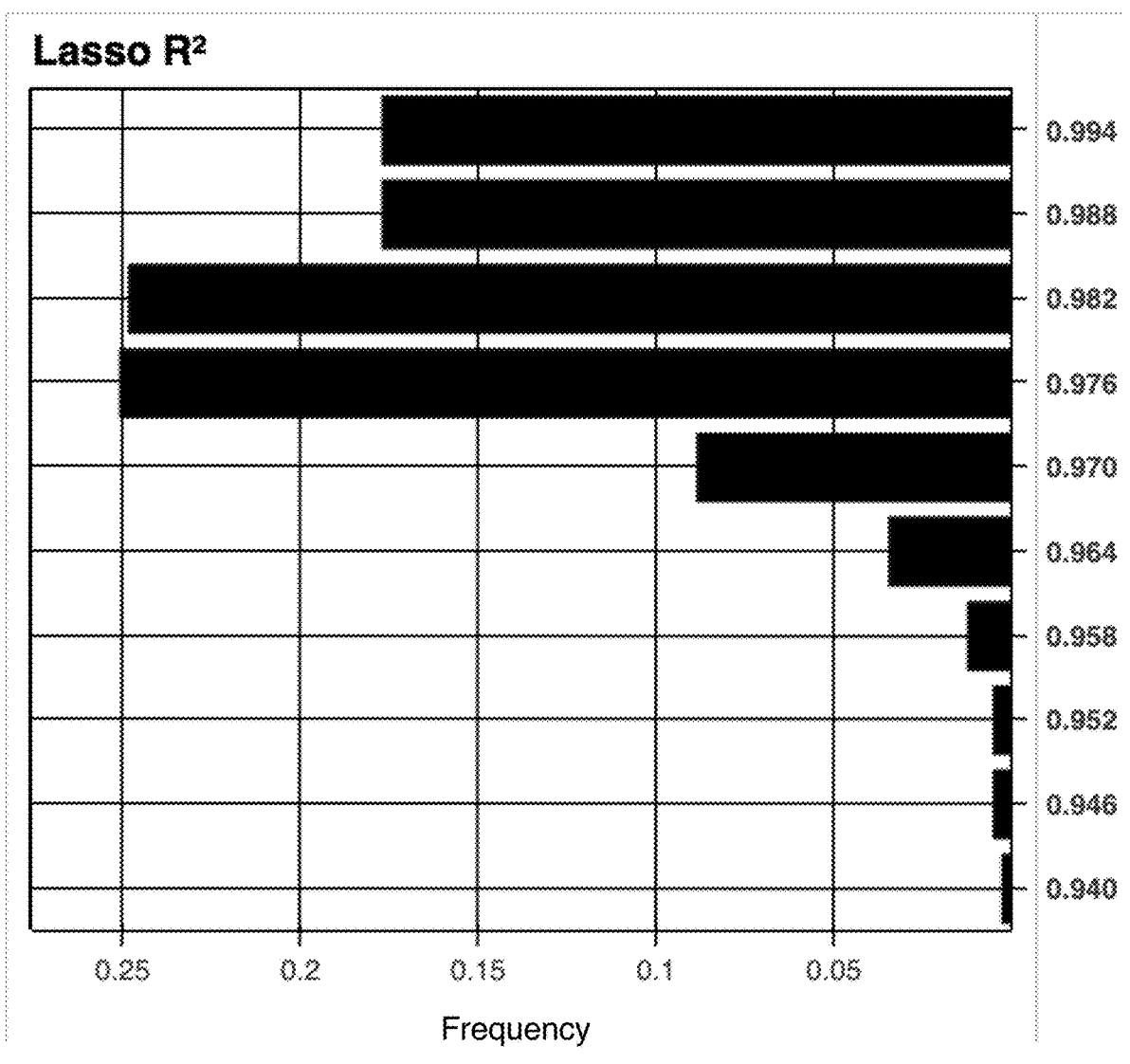
FIGS. 5A-B, 6A-B, 7-8 show results of an example comparing conventional linear least squares regression to a LASSO regression in this context.
Figure 5B:
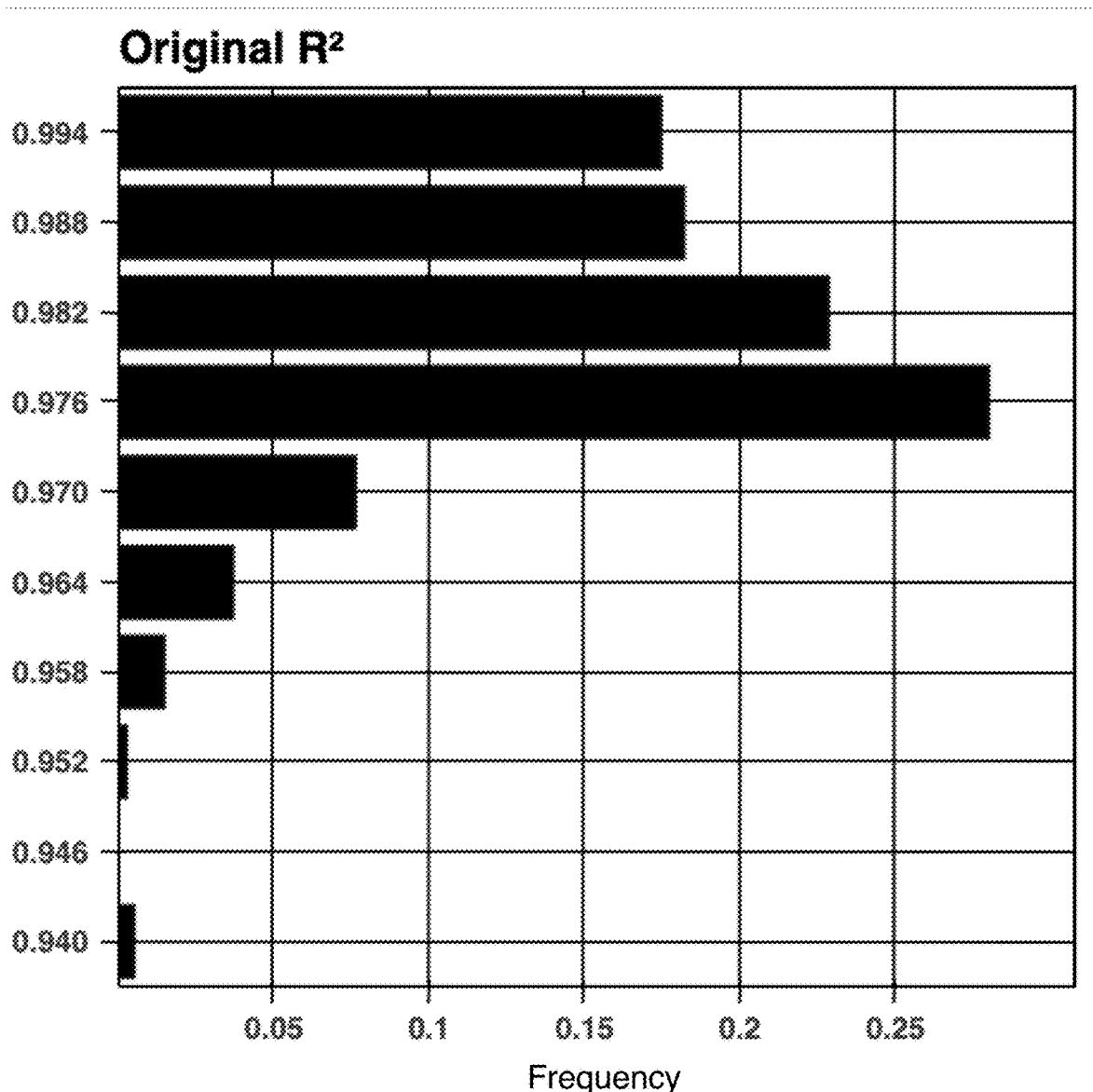

FIGS. 5A-B show $R^2$ performance of LASSO reduced model (FIG. 5A) and original model (FIG. 5B). The performance is very similar. Here the horizontal axis is statistical relative frequency (not the frequencies that measurements are being done at), and the vertical axis bins the data as in a histogram. E.g., in the LASSO plot, roughly 25% of the per-frequency fits have $R^2$ in the 0.982 bin of the histogram, and another 25% (roughly) of the per-frequency fits have $R^2$ in the 0.976 bin of the histogram.

Figure 6A:
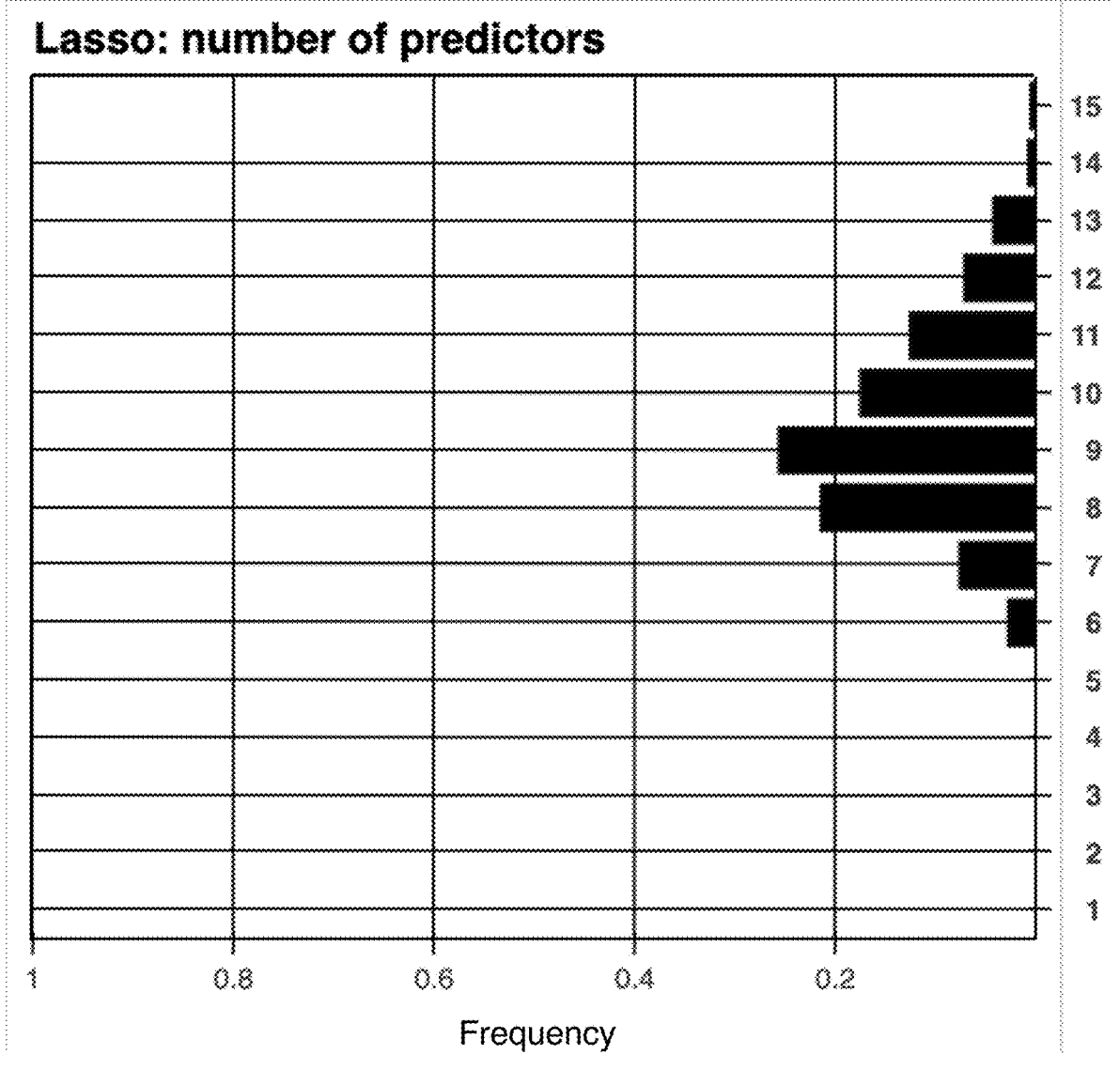
Figure 6B:
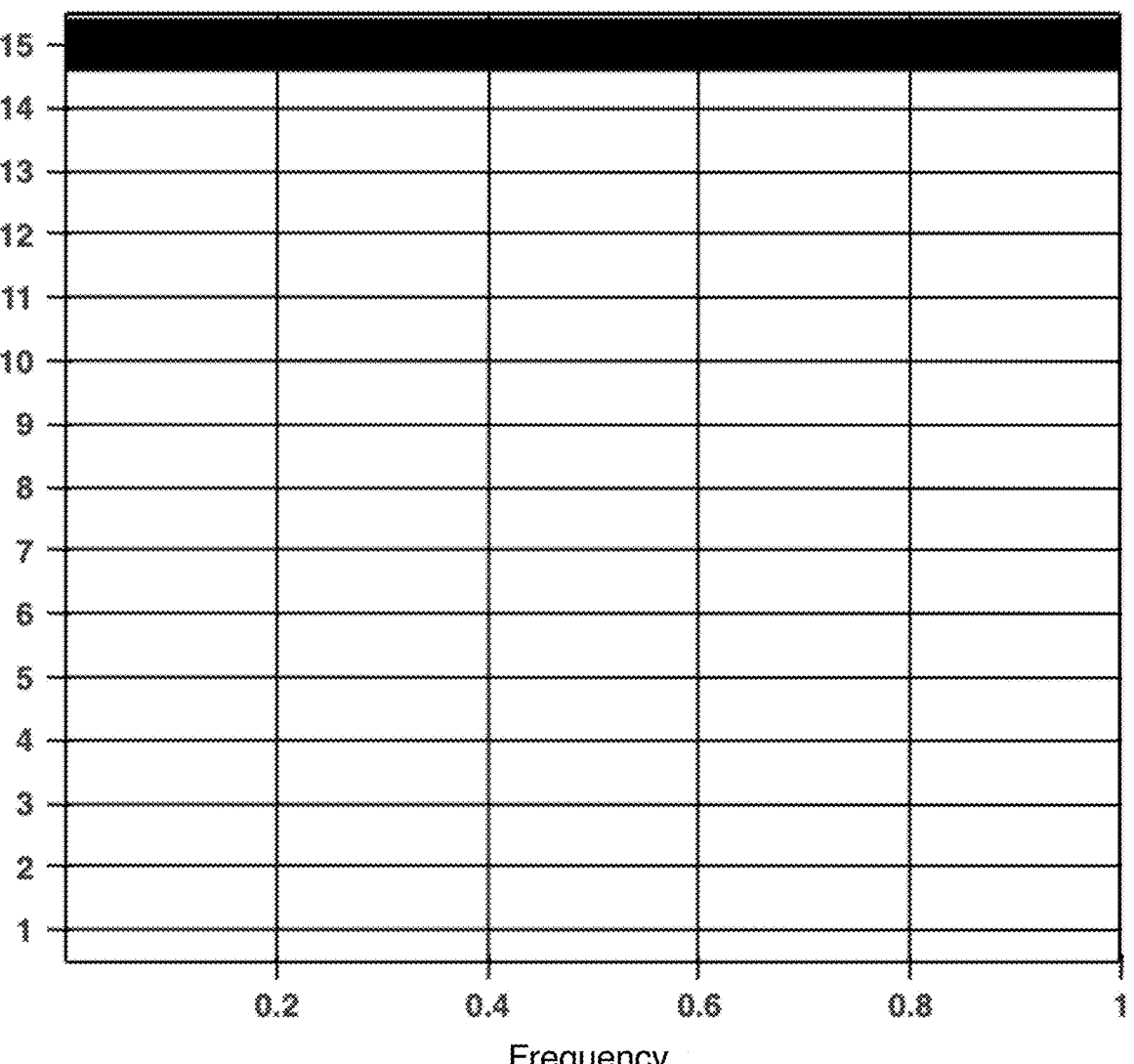

FIGS. 6A-B show the number of predictors used by the LASSO model (FIG. 6A) and original model (FIG. 6B). As the original model is a linear regression model, it always uses all predictors, while the LASSO model is more parsimonious. In other words, at some frequencies in the frequency scheme $\Omega$, the LASSO regression ends up using fewer parameters than at other frequencies.

Figure 7:
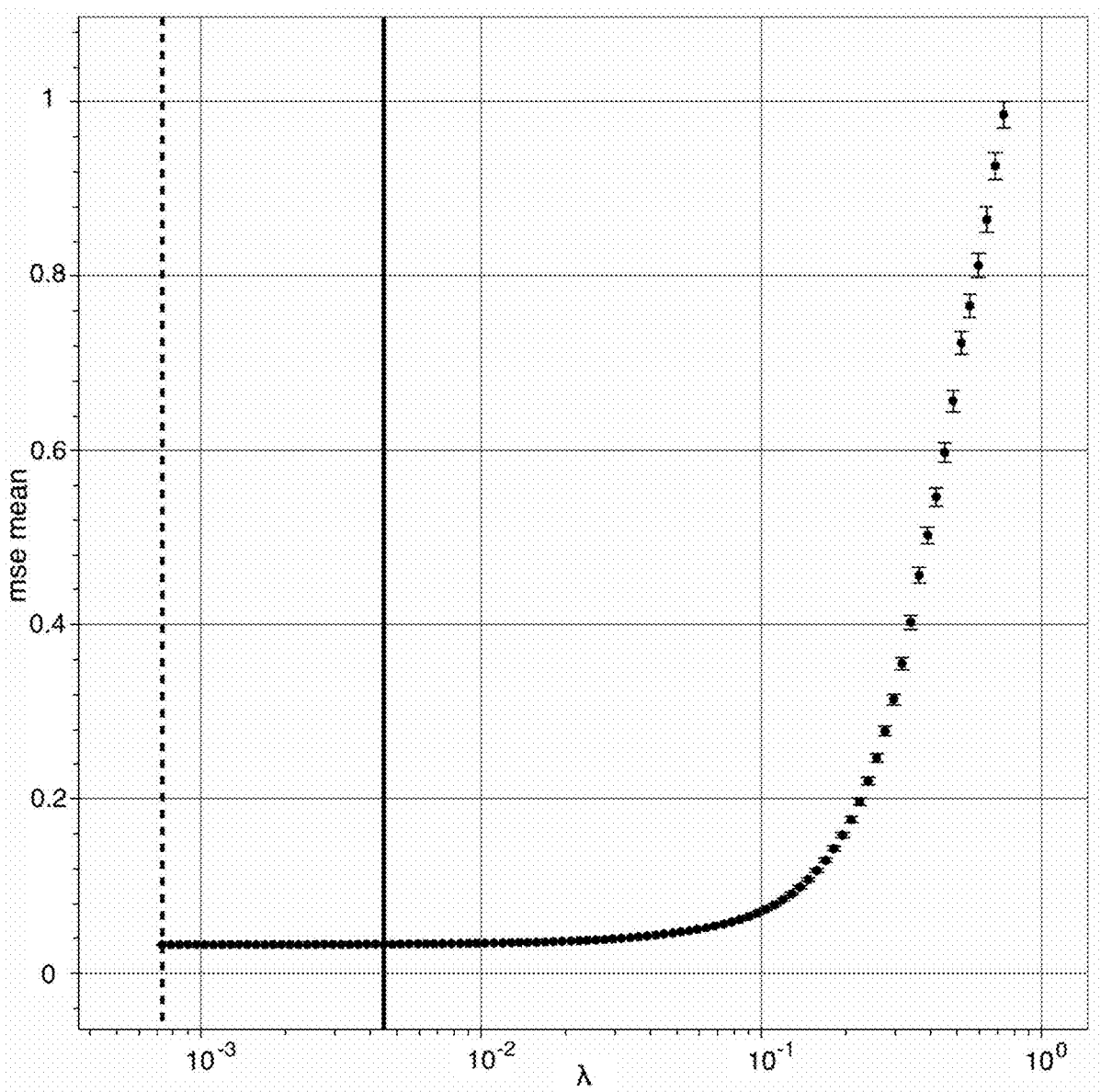

FIG. 7 shows an example of hyperparameter selection at a single measurement frequency using the above-described one-standard-error rule. The dashed vertical line corresponds to the value of the constraint hyperparameter A that minimizes the cross-validated LASSO error. The solid vertical line on the right corresponds to the chosen value of the hyperparameter based on the one-standard-error rule. The error bars indicate the pointwise standard error based on the cross-validation splits.

Figure 8:
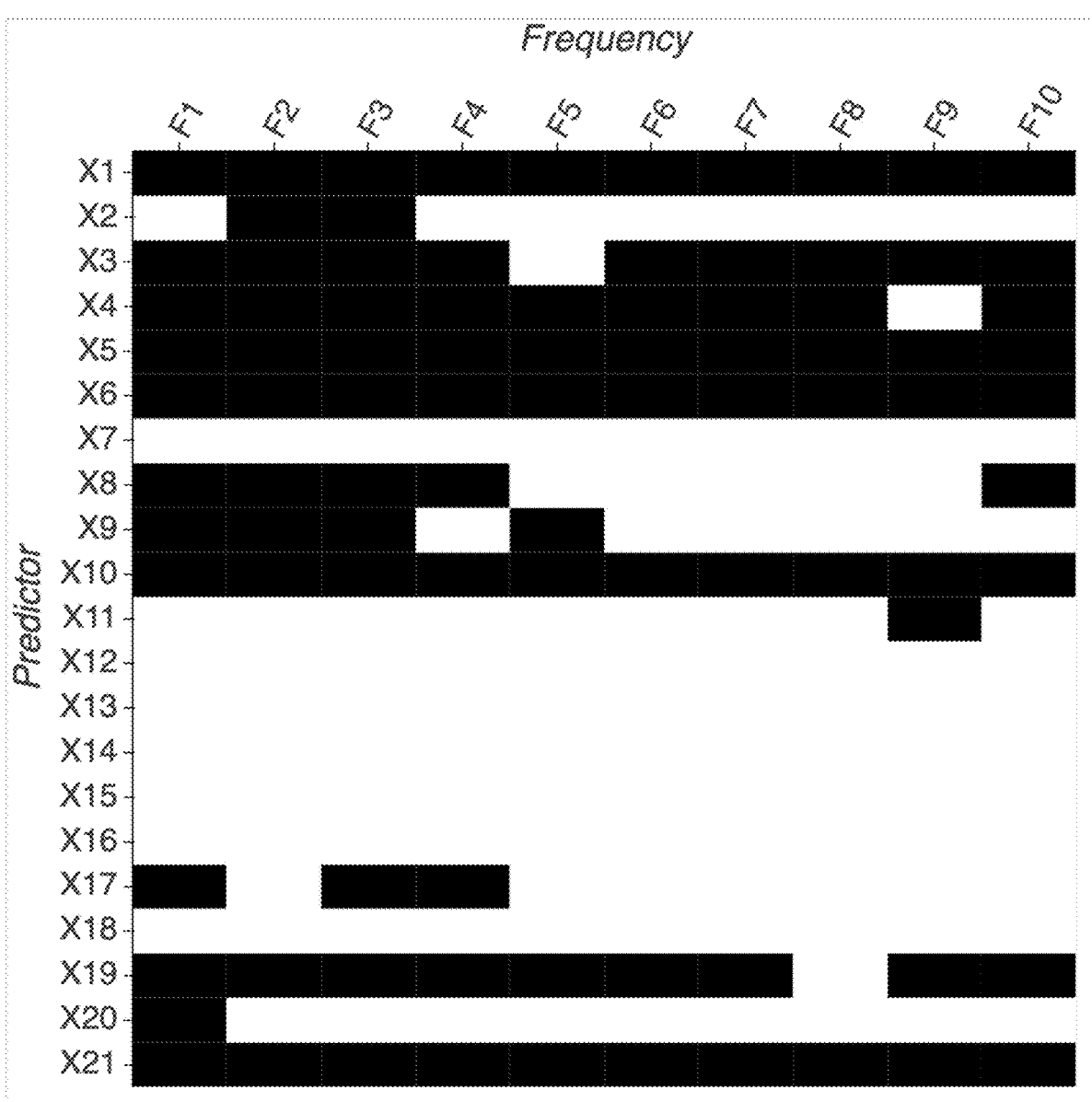

FIG. 8 is an example of the result of the LASSO predictor selection displayed as a Boolean mask. For every frequency (column), only some predictors (rows) are selected (black). Several other predictors are not selected (white).

The invention claimed is:

1. A method comprising:

measuring optical absorption with an optical spectroscopy instrument at two or more distinct measurement frequencies to provide a raw spectrum;

for each measurement frequency, correcting its corresponding optical absorption by subtracting a corresponding correction to provide a corrected spectrum;

wherein each correction is a polynomial in one or more environment variables having per-frequency coefficients determined by a prior calibration, wherein the per-frequency coefficients can be different for different frequencies.

2. The method of claim 1, further comprising performing a spectral fit to the corrected spectrum to determine one or more analyte concentrations, whereby an effect of spectral interference on accuracy of analyte concentration measurements is reduced by use of the corrected spectrum.

3. The method of claim 1, wherein the two or more distinct frequencies are selected from a predetermined frequency list, and wherein the prior calibration includes determining per-frequency coefficients for all frequencies in the predetermined frequency list.

4. The method of claim 3, further comprising deleting any data point of the raw spectrum having a frequency difference from a nearest frequency of the predetermined frequency list above a predetermined error threshold.

5. The method of claim 1, wherein the one or more environment variables are selected from the group consisting of: pressure, temperature, concentrations of one or more absorbing gas species, concentrations of one or more non-absorbing gas species, relative isotope abundance of one or more absorbing gas species, $H_2O$ concentration, $CO_2$ concentration, and $CH_4$ concentration.

6. The method of claim 1, wherein values of the one or more environment variables are obtained by a method selected from the group consisting of: spectroscopic measurement, sensor measurement, and specified environment conditions.

7. The method of claim 1, wherein the prior calibration includes determining the per-frequency coefficients according to a method selected from the group consisting of: calibration measurement and spectral modeling.

8. The method of claim 1, wherein the optical spectroscopy instrument is selected from the group consisting of: cavity ring-down spectroscopy instruments and cavity enhanced absorption spectroscopy instruments.

9. The method of claim 1, wherein terms of the polynomial in one or more environment variables are a selected subset selected from a master list of correction terms, and wherein selection of the subset is a data-driven selection.

10. The method of claim 9, wherein input for the data-driven selection is selected from the group consisting of: spectral models and the raw spectrum.

11. The method of claim 10, wherein the data driven selection comprises performing a Least Absolute Shrinkage and Selection Operator (LASSO) analysis to determine the selected subset on a per-frequency basis.

* * * * *